April 23, 1929.
W. T. MURPHY
1,710,376
TOBACCO STRIPPER
Filed June 15, 1928
2 Sheets-Sheet 2
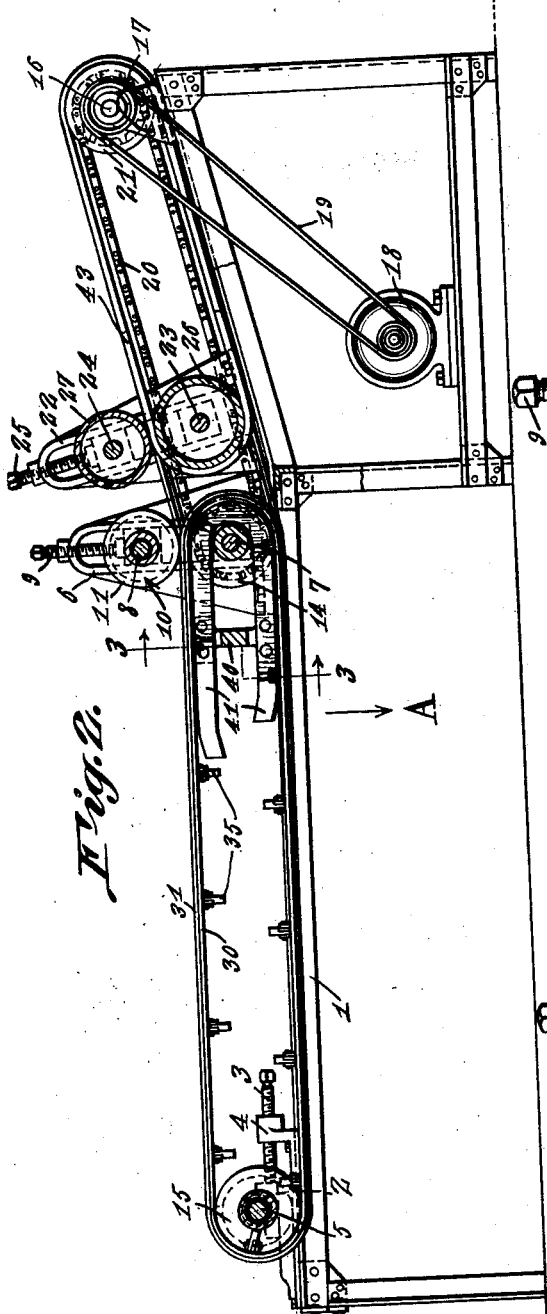
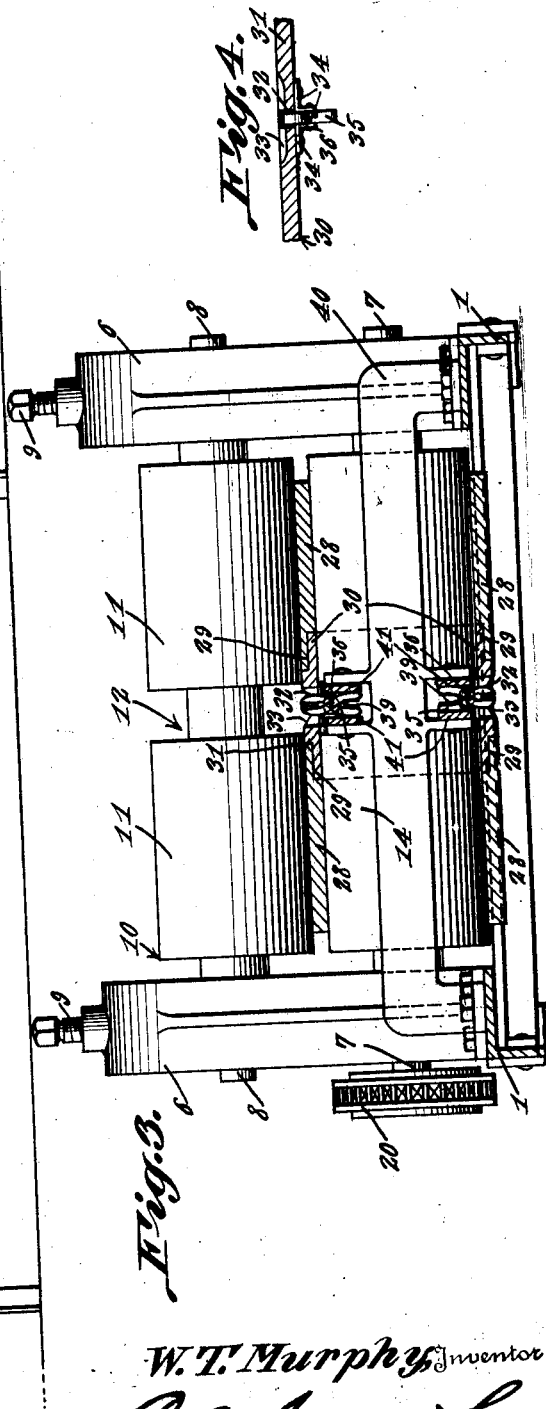

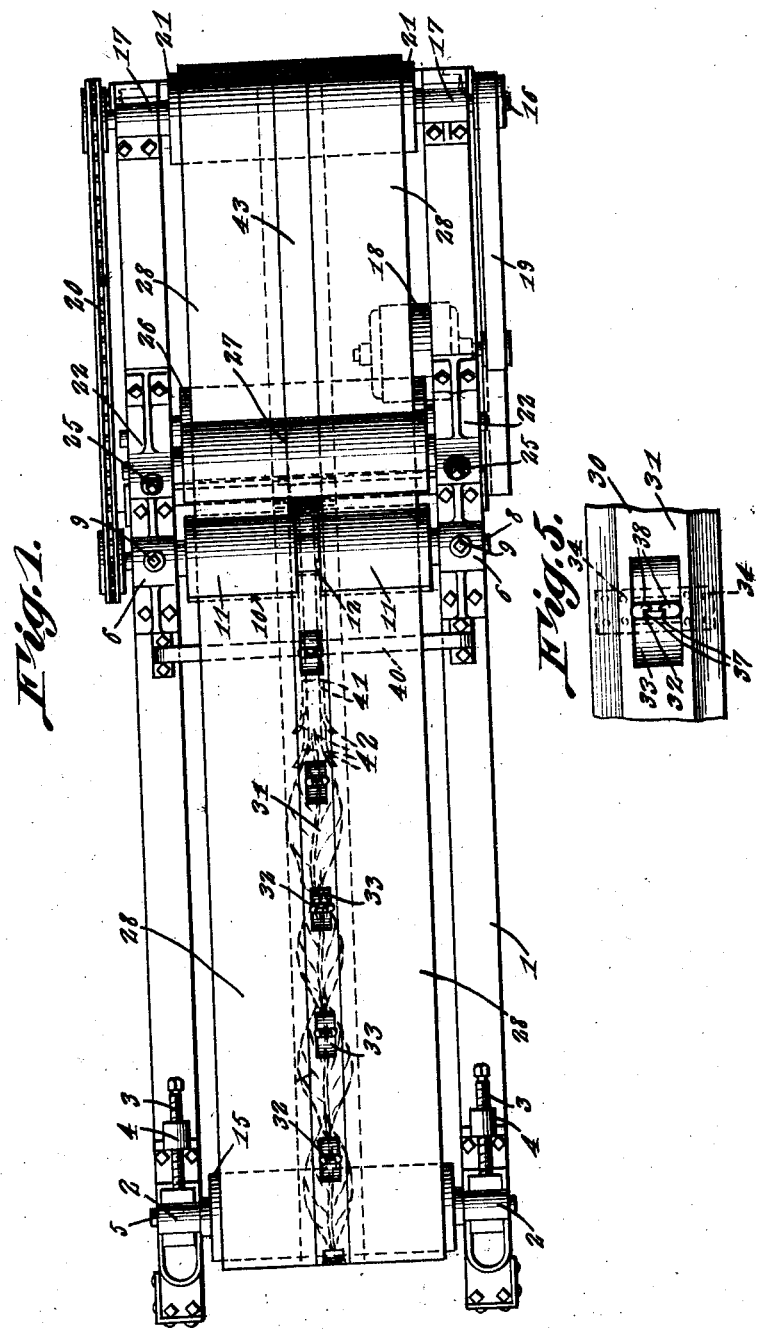

Patented Apr. 23, 1929.

1,710,376

UNITED STATES PATENT OFFICE.

WILLIAM T. MURPHY, OF ST. LOUIS, MISSOURI.

TOBACCO STRIPPER.

Application filed June 15, 1928. Serial No. 285,739.

This invention aims to provide a simple but efficient means for stripping the stalks out of tobacco leaves.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the accompanying drawings:—

Figure 1 shows in top plan, a device constructed in accordance with the invention;

Figure 2 is a longitudinal section;

Figure 3 is a cross section on the line 3—3 of Figure 2;

Figure 4 is a fragmental longitudinal section showing one of the grippers which are mounted on the stripping belt;

Figure 5 is a fragmental plan showing a portion of the stripping belt.

The numeral 1 marks a frame. Bearings 2 are slidably mounted on one end of the frame. Screws 3 cooperate with the bearings 2 and are threaded into brackets 4 on the frame. The screws 3 serve as a belt tightener. A shaft 5 is mounted to rotate in the bearings 2. Standards 6 are erected on the frame 1. A lower shaft 7 is mounted to rotate in bearings slidable in the standards 6. An upper shaft 8 is mounted to rotate in bearings slidable in the standards 6. Screws 9 are threaded into the upper ends of the standards 6 and constitute means for forcing down a pressure roller 10 which is carried by the shaft 8.

The pressure roller 10 is made up of clyindrical parts 11 between which there is a space 12. A first intermediate pulley 14 is mounted on the shaft 7. The pulley 14 is constructed like the pulley 10. A first outer pulley 15 is secured to the shaft 5. The pulley 15 is constructed like the pulley 10.

A shaft 16 is journaled in bearings 17 at the rear end of the machine. A motor 18 is mounted on the frame 1. The shaft 16 is driven from the motor 18 by a belt connection 19. The shaft 7 is driven from the shaft 16 by a chain and sprocket connection 20. There is a pulley 21 on the shaft 16.

Standards 22 are erected on the frame 1. A lower shaft 23 is journaled in bearings slidable in the standards 22. An upper shaft 23 is journaled in bearings slidable in the standards 22. Screws 25 are threaded into the upper ends of the standards 22. There is a pressure roller 27 on the shaft 24. The screws 25 shove down the pressure roller 27 with respect to a pulley 26. The pulley 26 is mounted on the shaft 23. A pair of transversely spaced leaf-conveying belts 28 are provided. The belts 28 are engaged around the pulleys 21 and 15 at the ends of the machine.

The upper runs of the belts 28 pass between the pressure roller 10 and the pulley 14; they pass, also, between the pressure roller 27 and the pulley 26. On the under surfaces of the leaf-conveyors 28, at the inner edges thereof, there are recesses 29. This is shown best in Figure 3.

A stripping belt 30 is provided. The stripping belt 30 has a longitudinal rib 31 which extends upwardly between the inner edges of the belts 28, as shown in Figure 3. The outer edge portions of the stripping belt 30 are received in the recesses 29 of the belts 28.

There are longitudinal spaced recesses 33 in the upper surface of the rib 31 of the stripping belt 30. The rib of the stripping belt is provided with openings 32 which communicate with the recesses 33. Plate like supports 34 are secured to the inner surface of the stripping belt 30. Grippers 35 are fulcrumed, intermediate their ends, at 36, on the supports 34. The upper ends of the grippers 35 extend through the opening 32 and into the recesses 33 of the stripping belt 30. The working ends of the grippers 35 have shoulders 37 (Figure 5) adapted to engage and hold the tobacco stems. The working ends of the grippers 35 have cooperating blades 38. Springs 39 are secured between the lower ends of the grippers 35. The springs 39 tend to open the grippers.

A cross piece 40 is secured to the side portions of the frame 1. On the cross piece 40 is a closing track 41 made up of two members placed side by side. The track has flaring ends 42, as shown in Figure 1. A belt 43, which may be called a third belt, is located in alinement with the stripping belt 30 and is engaged with the pulley 26 and with the pulley 21.

In practical operation, the tobacco leaves are laid on the stripping belt 30, the stems of the leaves being placed between the working ends of the grippers 35. As the belt 30 advances, the lower ends of the grippers 35 pass between the members of the closing track 41, and the working ends of the grippers are closed together. By this operation, the cutting portions or blades 38 of the grippers 35 cut off the end of the stem which is in the tip of the leaf, and the part of the stem which has to be torn out of the leaf is caught and bound between the shoulders 37 of the grippers 35. As the belts 28 and 31 move forwardly together, the leaf ultimately passes beneath the roller 11 and is held down at its sides by the roller 11, on the belts 28. The grippers 35 move downwardly and to the left in Figure 2, and in this way, the stem is torn out of the leaf and drops down at about the point shown by the arrow A in Figure 1, when the inner ends of the grippers 35 ride free of the lower portion of the closing track 41. The main portions of the leaf, which are to be used, are held down by the roller 27 and are carried rearwardly by the belts 28 and 43. It will be understood that the machine shown and described may be duplicated to any desired extent, in order to increase its capacity.

The drive is derived from the motor 18 and is transmitted to the shaft 18 by the belt 19. The chain and sprocket connection 20 transmits motion from the shaft 16 to the shaft 7 and the roller 14. The other drives result from frictional engagement between parts, an observation which will be understood readily when it is observed that the belts 28 drive the pulley 10.

The space 12 in the rollers 10, 15 and 14 is to accommodate the grippers 35.

What is claimed is:—

1. In a tobacco stripping machine, first and second outer pulleys, an intermediate pulley located between the outer pulleys, a stripping belt engaged around the first outer pulley and around the intermediate pulley, a stem grip carried by the stripping belt, means for keeping the grip closed whilst the stripping belt is passing around the intermediate pulley, a leaf-conveying belt engaged around the first and second outer pulleys, and traveling with the upper run of the stripping belt from the first outer pulley to the intermediate pulley, the leaf conveying belt traveling beyond the stripping belt from the intermediate pulley to the second outer pulley, and means for holding a leaf on the conveying belt as the leaf-conveying belt moves across the intermediate pulley and whilst the stripping belt moves around the intermediate pulley and takes out the stem of the leaf.

2. A tobacco stripping machine constructed as described in claim 1 and further characterized by a second intermediate pulley disposed between the first intermediate pulley and the second outer pulley, a third belt alined with the stripping belt and engaged around the second intermediate pulley and around the outer pulley, and a pressure roller cooperating with the second intermediate pulley and with the leaf-conveying belt and with the third belt.

In testimony that I claim the foregoing as my own, I have hereto affixed my signature.

WILLIAM T. MURPHY.